United States Patent [19]

Jensen, Per J. T.

[11] Patent Number: 5,003,163
[45] Date of Patent: Mar. 26, 1991

[54] HEAT RECOVERABLE ARTICLE

[75] Inventor: Jensen, Per J. T., Slangerup, Denmark

[73] Assignee: Raychem Corporation, Menlo Park, Calif.

[21] Appl. No.: 511,866

[22] Filed: Apr. 18, 1990

Related U.S. Application Data

[63] Continuation of Ser. No. 242,081, Sep. 8, 1988, abandoned.

[30] Foreign Application Priority Data

| Sep. 9, 1987 | [GB] | United Kingdom | 8721181 |
| Oct. 9, 1987 | [GB] | United Kingdom | 8723761 |
| Dec. 14, 1987 | [GB] | United Kingdom | 8729120 |
| Jun. 21, 1988 | [GB] | United Kingdom | 8814688 |

[51] Int. Cl.$^5$ .............................................. H05B 3/00
[52] U.S. Cl. .............................. 219/535; 174/DIG. 8
[58] Field of Search ............... 219/535, 528, 504, 505, 219/549; 174/DIG. 8

[56] References Cited

U.S. PATENT DOCUMENTS

| 4,675,512 | 6/1987 | Doucet et al. | 219/535 |
| 4,689,474 | 8/1987 | Overbergh et al. | 219/528 |

Primary Examiner—Roy N. Envall, Jr.
Attorney, Agent, or Firm—Timothy H. P. Richardson; Marguerite E. Gerstner; Herbert G. Burkard

[57] ABSTRACT

A heat recoverable article comprising a conductive polymeric material with particular electrical properties. Preferably, when expanded from X% to Y% to render it recoverable the resistivity of the composition decreases on expansion in at least part of the X-Y expansion range. Preferably the composition exhibits a pseudo PTC ratio (peak resistivity/resistivity at 25° C.) in the range 1½–10. Preferably the composition has a resistivity which increases on recovery as measured in the direction of current flow, throughout the temperature range 20° C. to $T_e$ (extrapolated end temperature). The article is preferably tubular, and the electrtical behaviour allows it to be conveniently electroded with elongate electrodes, while avoiding overheating during recovery.

29 Claims, 4 Drawing Sheets

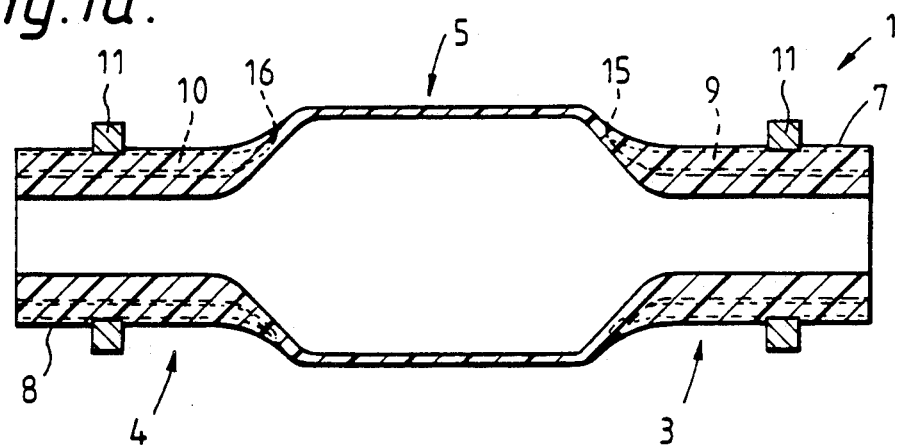
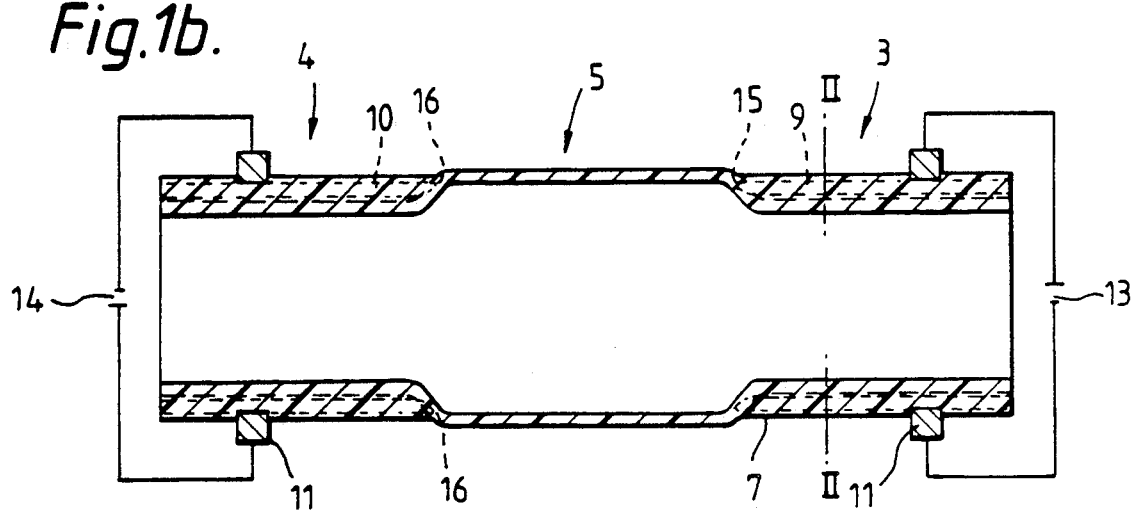
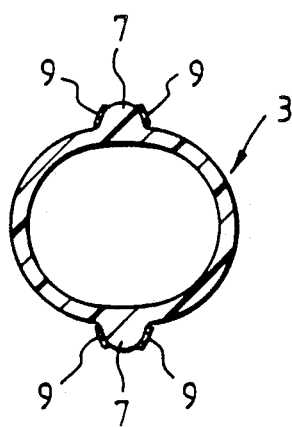

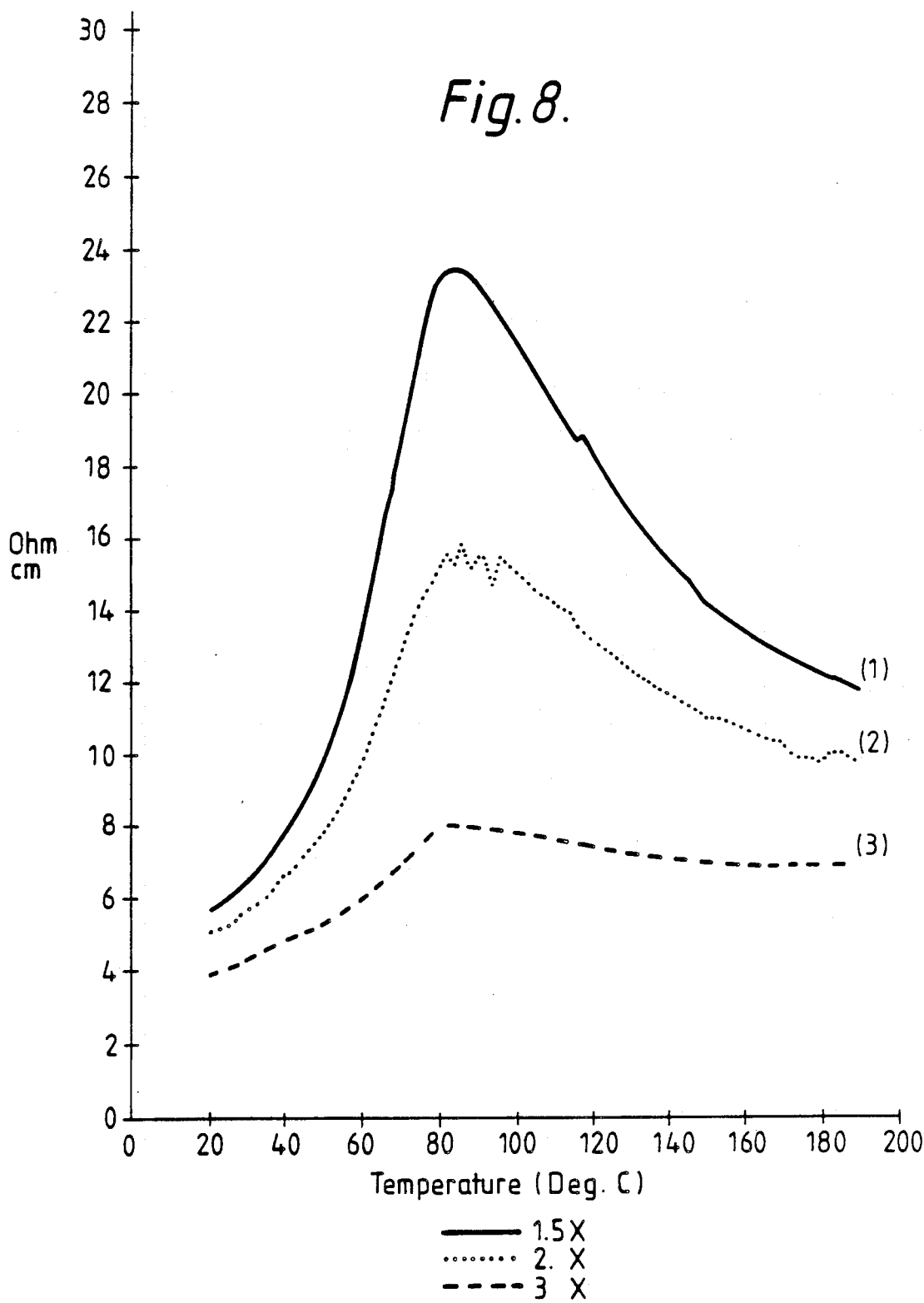

HEAT RECOVERABLE ARTICLE

This application is a continuation of application Ser. No. 07/242,081, filed Sept. 08, 1988.

This invention relates to a heat recoverable laminar article which comprises a conductive polymeric material, wherein the heat to effect recovery is provided by passing electrical current through the conductive polymeric material.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

Heat recoverable articles are known. In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensional heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent 1,440,524 in which an outer tubular elastomeric member is held in a stretched state by an inner tubular member.

Conductive polymeric materials and devices incorporating them are also well known. Reference may be made for example to U.S. Pat. Nos. 2,952,761, 2,978,665, 3,243,753, 3,351,882, 3,571,777, 3,658,976, 3,757,086, 3,793,716, 3,823,217, 3,858,144, 3,861,029, 3,950,604, 4,017,715, 4,072,848, 4,085,286, 4,117,312, 4,151,126, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,470,898, 4,481,498, 4,476,450, 4,502,929; 4,514,620, 4,517,449, 4,534,889, and 4,560,498; J. Applied Polymer Science 19, 813–815 (1975), Klason and Kubat; Polymer Engineering and Science 18, 649–653 (1978), Narkis et al; European Application Nos. 38,713, 38,714, 38,718, 74,281, 92,406, 119,807, 133,748, 134,145, 144,187, 157,640, 158,410, 175,550 and 176,284; and Japanese Published Patent Application No 59-122,524.

Two early patent publications describing conductive, recoverable polymeric articles are GB 1265194 (Cook) and T905001 (U.S. defensive publication to Day). GB 1265194 describes a conductive polymeric, optionally shrinkable tubular layer, which is optionally used in conjunction with a non-conductive shrinkable tubular layer. Current is supplied to the conductive layer, to pass electric current therethrough, by alligator clips or other conventional clamps or electrodes. T905001 describes a heat-shrinkable plastics packaging bag, which has a conductive coating or contains conductive particles. The bag is lowered over a pallet to be covered and vertical electrodes attached to diagonally opposite vertical seams of the envelope and powered to cause current to flow between the electrodes to shrink the bag. In both Cook and Day the current flows, as in the present invention, in or parallel to the plane of the article.

It is also known to be desirable to use for a conductive recoverable article, a material which exhibits a PTC (positive temperature coefficient of resistivity) effect, that is a sharp rise in resistivity at a particular, or over a short range of temperatures. This temperature or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

There are a number of circumstances in which the predominant current flow may preferentially tend to one region rather than another region during recovery, for example, if the electrical resistance in the current path through one part of the article is lower than in adjacent regions. This may occur, for example, if part of the article is restrained so that the length of the current path through that part of the article is shorter. The likelihood of preferential current flow in one region is particularly severe inter alia in applications or articles where non-uniform recovery is most likely, for example where recovery ratios are large.

It is also known that many PTC materials exhibit a so-called "curl-over" effect, that is, the resistivity rises rapidly to a peak resistivity, and then the slope in resistivity changes. After the peak, the curve may decrease in slope, level off, or fall; (sometimes with a subsequent rise in resistivity).

It is also known that, for PTC materials, expansion can affect the PTC effect, and in particular that it can reduce the height of the anomalous rise in resistivity which occurs above the anomaly temperature. In general it is observed that for PTC materials the height of this anomaly is reduced on expansion. This is disadvantageous where a PTC material is expanded to make it recoverable since, in its stretched state the anomalous resistivity rise may not be sufficiently great to prevent the article reaching the "curl-over point" and hence runaway heating may occur. This is discussed in European Patent Application Publication No. 0220003 (MP1086), the disclosure of which is incorporated herein by reference.

The use of PTC materials also introduces a new problem; that of hot lining. This is the tendency for a zone of high resistance and consequent high voltage gradient to develop between, and generally parallel to, the electrodes during electrical powering. This problem is discussed in detail in U.S. Pat. No. 4,085,286 (Horsma/Diaz) which describes a telecommunications splice cause comprising conductive polymeric recoverable material. The problem of hot lining is avoided in U.S. Pat. No. 4,085,286 by using special flexible electrodes, which are planar and arranged on either side of the recoverable sheet. This means that the current flows through the thickness of the sheet, rather than in the plane of the sheet. With this arrangement hot-lining is substantially reduced, but may still occur, especially if the rate of increase of resistivity with temperature is large. While this arrangement is successful, it means that the electrodes, which must be substantially planar to pass current through the sheet thickness, must be specially designed to be flexible to allow them to remain in contact with the article during its recovery.

GB 1265194 (Cook) and T905001 (Day), in which the current flow is in the plane, do not specify whether the materials used exhibit PTC behaviour. The problem of hot-lining, if present, is not considered.

Heat recoverable conductive articles other than those described in GB 1265194 (Cook) and T905001 (Day) in which conduction is in the plane are also known. One is described for example in European Patent Application Publication No. 0157640 (MP0922). The article described in this application is a tubular coupler, for example for pipes. It comprises a material which is ZTC (i.e. one which exhibits a zero temperature coefficient of resistivity) and is consequently not subject to hot-lining. It has relatively low recovery and relatively thick walls compared to the outer diameter of the article. It is electroded by circumferential electrodes on either end of the coupler so that current flows along the length of the coupler. Because of its structure and low recovery, uneven and consequential preferential draw of current to any particular region of this article is unlikely. Were a similar ZTC article made which did exhibit uneven recovery, particularly if electroded so that the electrical resistance in the current path between the electrodes decreased on recovery) any part which recovered slightly first would preferentially draw even more current, leading to the possibility of overheating and so-called "runaway heating" of that region.

In the present invention we have discovered that electrical properties of a material (for example its resistivity change on recovery, expansion, and change in temperature) and the geometry of the part can be carefully selected, in a manner not previously foreseen, so that they adjust the flow of electrical current applied to recover an article made from conductive polymeric material, at least part of which is recoverable. In some embodiments the electrical properties of the material are selected, having regard to the geometry of the part (which may be predetermined by design characteristics) to adjust the flow of electrical current. The invention is particularly applicable in laminar articles to or in which electrodes can be connected to cause a substantial proportion of the current to flow substantially parallel to the faces of the article, i.e. articles in which the problems of hot-lining would occur where traditional PTC materials are used. The articles according to the invention advantageously can use simply shaped and applied electrodes, and can be used in applications where high recovery and/or uneven recovery occur. Their electrical behaviour encourages uniform heating of the part during recovery, and moderates the problem of runaway heating seen with ZTC materials. However they do not exhibit sufficient PTC effect to invoke, to any substantial extent, the problems of hot-lining seen with typical PTC materials.

Preferred articles according to the invention use electrical characteristics to control the flow of current in the article during recovery.

A first aspect of the invention provides a laminar article at least part of which has been expanded from X% to Y% to make it heat recoverable, the article comprising a conductive polymeric material the resistivity of which decreases on expansion, as measured in the direction of current flow, in at least part of the X-Y% expansion range.

X may be zero or finite, and Y is greater than X.

The term "laminar" as used in this specification, is used to include any article in which the conductive polymer compositions have two dimensions which are much larger than the third dimension. Thus a laminar article can be planar, or cylindrical, including tubular articles of open (wraparound) or closed cross section. When tubular articles are used they may be open at one or both ends.

Where the electrical current flows substantially parallel to the faces of the article it is to be understood that the current will flow in a volume of finite thickness. Thus for example for a generally tubular article with two longitudinal diametrically opposed electrodes, current will flow around the circumference of the article in a tubular volume of finite thickness, one or both surfaces of which may correspond to the surface of the article.

Preferably the electrical current flows in a direction parallel to the plane of the article, at least above the anomaly temperature of the composition of the article. Preferably the electrical current flows in a direct path between the electrodes.

The material is expanded to render it recoverable. In these cases the material is preferably one with a resistivity which decreases on said expansion, in at least part of the expansion range. Preferably the material is one which at some expansion has a resistivity which is less than or substantially equal to the zero expansion resistivity. When the material is expanded from 0% it will generally rise in resistivity to a peak value and then fall. The peak may be at any expansion e.g. at 5%, 10% or in some cases even as high as 200% expansion. Preferably this behaviour is reversible, and the resistivity again increases on recovery, when the initial expansion is reversed.

A second aspect of the invention provides a laminar article at least part of which is heat-recoverable, comprising a conductive polymeric material which has a resistivity which increases on recovery, as measured in the direction of current flow, throughout the temperature range 20° C. to $T_e$.

The extrapolated end temperature ($T_e$) is measured by differential scanning calorimetry as described in ASTM D3418-82.

By using a material whose resistivity decreases on expansion, a preferentially expanded part can be arranged so that the initial prerecovery resistivity of various parts is different, so that current is preferentially directed to those regions where recovery is desired when the current is first switched on. Also where such a material exhibits reversible resistivity behaviour i.e. a resistivity decrease on expansion and subsequent increase during at least part of the recovery process, this can be used to shunt current away from the most recovered parts at any stage in the recovery of the article. Thus the resistivity change with expansion of the material, if reversible, can be utilised to adjust the flow of current through the article both when the current is first switched on, and during actual recovery of the article.

Another electrical characteristic that can be used to control the flow of current in the article is its resistivity temperature behaviour. Advantageously the articles exhibit a small increase in resistivity on increase in temperature This is referred to hereinafter as a pseudo-PTC effect. This term "pseudo" is used since although there is an increase in resistivity, it is significantly less than that exhibited by materials traditionally referred to as PTC, and is not to be confused therewith.

A third aspect according to the invention provides a laminar article at least part of which is heat-recoverable, comprising (a) a conductive polymeric material which at least in its recoverable state exhibits a pseudo PTC ratio in the range 1½ to 10, and (b) two or more electrically conductive connection means, which when connected to a source of electrical power cause a substantial proportion of the electrical current to flow substantially parallel to the faces of the article.

As used herein the term "electrically conductive connection means" may mean electrodes, or part of the article to which electrodes can conveniently be connected.

Preferably the pseudo PTC ratio of the material at least prior to recovery is in the range 2½–5 especially about 3. The preferred pseudo PTC ratios are especially preferred for materials expanded 25%–500% (1.25X–6X), especially 25%–300% (1.25X–4X), more especially 50%–150% (1.5X–2.5X).

As described before where a material exhibits a PTC effect it typically exhibits a curl over effect, that is it reaches a peak after which the resistivity/temperature curve changes its slope, typically decreasing in slope, levelling off, or falling in resistivity sometimes with a subsequent rise in resistivity. For the pseudo PTC materials defined herein, the pseudo PTC ratio is defined as the ratio of that "peak" resistivity to the resistivity at 25° C. of the material. The peak resistivity is the highest resistivity where curl-over with a subsequent decrease in resistivity occurs (referred to herein as negative curl-over), or the point of inflection, where merely a change in slope of the curve occurs (referred to herein as positive curl-over).

Resistivity/temperature curves by which the quoted pseudo PTC ratio measurements are calculated are obtained using the following method.

Test samples of the unexpanded, cross-linked material are cut in the form of dumb-bells. These are clamped at the ends in suitable expansion equipment and heated to a temperature above the peak $T_m$ of the composition e.g. $T_m + 100°$ C. They are then expanded by moving apart the clamps to stretch the central, necked region of the dumb-bell in a uniform manner. The material is then allowed to cool to room temperature whilst held in the expanded state, thus "freezing in" the expansion. Expansion ratio is measured by the movement of marks positioned on the surface of the dumb-bell in the region of uniform expansion.

Silver paint electrodes are then applied to one face of the sample over the entire area, except for a ½ inch wide region in the centre of the expanded portion which forms the area under test. The paint is allowed to dry for 24 hours.

The samples are mounted in a test rig using metal clamps that hold the samples clamped such that they cannot move or recover during the test cycle.

The samples are then mounted in a programmable oven and connected to a computer controlled data acquisition system. A four-wire technique is used to minimise the effects of the lead resistances. Connection is via the metal clamps.

The oven is a fan assisted unit for good temperature uniformity and has cooling by means of liquid nitrogen or carbon dioxide in order to give controlled rates of heating and cooling.

The programmed temperature cycle is approximately as follows:

(1) Cool to 10° C. (2) Hold for 20 minutes. (3) Heat to 200° C. at 2 C/min. (4) Hold for 20 minutes. (5) Cool to 10° C. at −2 C/min.

The resistance of the samples is electronically scanned throughout the cycle at every 2° C.

At the end of the test these data are converted to resistivity using the length, width and thickness of the sample and then plotted out as a graph of resistivity against temperature.

The preferred pseudo PTC ratio ranges quoted above e.g. 1½ to 10 etc are for the material of the article according to the invention, i.e. an article in its recoverable state. Such a material has generally already been heated once, e.g. in order to deform the material to render the article recoverable. This distinction is important since the initial heating to deform step may significantly alter the behaviour of the material, seen on subsequent heating. Thus the pseudo PTC ratios quoted are from resistivity vs temperature curves measured for materials obtained during heating of materials that have already been heated once in the expansion process.

The pseudo PTC effect of the material has no effect on the initial current flow through the article (since all parts are then at the same temperature). However it does affect the magnitude and distribution of current flow during recovery as the article heats with the result that current is shunted from the hotter regions to other regions. Uneven heating is thus avoided.

Preferably the pseudo PTC ratio is still present on recovery. Indeed preferably it increases to prevent runaway heating of the recovered article. As an example, the material may have a pseudo PTC ratio of 8 or more after free recovery.

Thus both resistivity/recovery/expansion and resistivity/temperature characteristics of the material can be used to shunt current from one part of an article to another during the recovery process. Preferably an article exhibiting both the preferred resistivity/recovery/expansion and resistivity/temperature behaviour is used.

The invention according to the first and second aspect of the invention is particularly useful for articles which recover non-uniformly where the geometry changes occuring during recovery would otherwise tend to concentrate the predominant flow of current in one region, risking overheating etc. In these cases employing the electrical characteristics of the material to shunt the current away from that region is advantageous. Uneven recovery may occur for a number of reasons, of which some examples are now given. A first example is an article that is an irregularly shaped part, for example a tubular article which varies in cross-section or in cover thickness along its length. A second example is an article, which may be irregularly shaped or not, that is recovered onto an irregularly shaped substrate, e.g. not a flat surface or a regular tube. A third example is when ambient conditions (pressure, temperature, etc.) cause some parts of the article to recover before others. Such non-uniform recovery is exacerbated where recovery ratios are greater than 10%, especially greater than 100%.

The non-uniform recovery presents particular problems if it causes geometry changes to the part which would tend to concentrate the current in the most recovered parts: for example if the electrode separation decreases and/or the cover thickness increases on recovery; both of which reduce the resistance between the electrodes. In these cases the electrical characteristics of the material can be designed to compensate for the geometry changes in the part.

Thus, the first and second aspects of the present invention recognise that for a laminar article where current flow is substantially parallel to the faces of the article (which avoids the need for the special electroding described in U.S. Pat. No. 4,085,286 (Horsma/Diaz)) the potentially dangerous problems of non-uniform current flow caused by uneven recovery, and also the problems of hot-lining, can both be avoided by using a material with specified electrical characteristics viz the defined pseudo PTC effect and/or resistivity vs recovery and expansion behaviour which regulates the current flow in the article.

The wall thickness and electrode separation can be tailored to direct the predominant initial flow of current through the article, the thickest walls and closest spaced electrodes concentrating the current.

As well as varying the wall thickness of the material of the article, two or more layers of different materials may be used. The second or additional layers may extend along the whole or only part of the length of the article. They may have electrical properties, e.g. room temperature resistivity and resistivity/temperature behaviour, that is the same as, or different to, that of the first material. As an example the second or subsequent layer(s) may comprise a material that exhibits traditional PTC behaviour or ZTC behaviour. The effect of the additional layer(s) is that it (they) provide additional material through which electrical current can flow, and hence provide additional heating. By appropriate choice of the resistivity of the material of the additional layer(s) greater heating can be achieved than would be the case were a similar additional thickness of the first material used. This may be advantageous, for example to decrease recovery time in certain regions, or where a higher temperature is required. Therefore in some preferred embodiments second or subsequent layers of material different to the first material are added in selected regions.

Similarly the thermal load of various sections of the article can be varied, for example by adjusting the thickness of the adhesive or sealant on the sections of the article. The sections with the thickest adhesive will take the longest to heat, and hence the amount of heating of the sections is varied.

Another example of using two layers of different materials is where certain properties, e.g. flame retardancy, solvent resistance, abrasion resistance, electrical insulation, impact resistance, colour coding are required.

Where two or more layers are used these may be applied separately for example by sequential extrusion, or may be co-extruded.

The resistivity of the material preferably decreases when deformed, for example expanded from X% to Y%, where X may be 0 or any number less than Y. Preferably the resistivity decreases when expanded more than 25%. The resistivity also typically changes with temperature, so that there is a 3-dimensional relationship between resistivity, expansion and temperature. Preferably, for the material, the resistivity after expansion is less than the resistivity after or during recovery for expansion ratios of 25–600% over the temperature range of −30° C. to +200° C., and also in the range 20° C. to $T_e$ (as hereinefore defined). This behaviour shunts the predominant direction of current flow to avoid concentrations of electrical current during recovery.

A fourth aspect of the invention provides a heat-recoverable conductive polymeric material which has been expanded from X% to Y% to render it recoverable, and is suitable for use in an article according to the invention, comprising a material the resistivity of which decreases on expansion, as measured in the direction of current flow, in at least part of the X-Y expansion range, and exhibiting a pseudo PTC ratio in the range 1½ to 10.

The invention may have many applications. One application is for covering a substrate. Thus a fifth aspect of the invention provides a method of covering a substrate, comprising:
(a) positioning a heat recoverable laminar article according to the first or second aspect of the invention around the substrate, and recovering the article into contact with the substrate.

Also a sixth aspect of the invention provides a method of covering a substrate, comprising:
(a) positioning a heat recoverable laminar article comprising a conductive polymeric material at least part of which is recoverable around the substrate, wherein the material, at least in its recoverable state exhibits a pseudo PTC ratio in the range 1½ to 10; and
(b) positioning two or more electrodes in or on the conductive polymeric material, and connecting them to a source of electrical power to cause a substantial proportion of the electrical current to flow substantially parallel to the faces of the article to heat and hence to recover the article.

Any conductive polymeric material having the desired, above-defined, electrical properties is particularly suitable for use in the present invention. A number of suitable compositions have been made using a variety of polymeric compositions and carbon-black conductive filler particles. These compositions are listed in table 1 below. In each case the materials were prepared using a K-0 Intermix, an internal mixer of approximate charge size of one liter. The mixing conditions were set to produce homogeneous materials in minimum time.

TABLE 1

| COMP. NO | POLYMER RESIN | RESIN PARTS BY WEIGHT | CARBON BLACK | BLACK PARTS BY WEIGHT | ANTIOXIDANT PARTS BY WEIGHT |
| --- | --- | --- | --- | --- | --- |
| 1 | UCAR FLX DFDA 1137 | 59.4 | VULCAN P | 39.6 | 1 |
| 2 | STAMYLEX 2H286 | 59.4 | VULCAN P | 39.6 | 1 |
| 3 | STAMYLEX 2H287 | 59.4 | VULCAN P | 39.6 | 1 |
| 4 | STAMYLEX 08-076 | 59.4 | VULCAN P | 39.6 | 1 |
| 5 | RIBLENE D DV 2725 | 59.4 | VULCAN P | 39.6 | 1 |

TABLE 1-continued

| COMP. NO | POLYMER RESIN | RESIN PARTS BY WEIGHT | CARBON BLACK | BLACK PARTS BY WEIGHT | ANTIOXIDANT PARTS BY WEIGHT |
|---|---|---|---|---|---|
| 6 | ELVAX 770 | 59.4 | VULCAN P | 39.6 | 1 |
| 7 | ESCORENE UL00909 | 59.4 | VULCAN P | 39.6 | 1 |
| 8 | ELVAX 460 | 59.4 | STATEX N110 | 39.6 | 1 |
| 9 | ELVAX 470 | 59.4 | VULCAN P | 39.6 | 1 |
| 10 | ELVAX 460 | 59.4 | VULCAN P | 39.6 | 1 |
| 11 | ALATHON A-701 | 59.4 | VULCAN P | 39.6 | 1 |
| 12 | ALATHON A-702 | 59.4 | VULCAN P | 39.6 | 1 |
| 13 | ALATHON A-703 | 59.4 | VULCAN P | 39.6 | 1 |
| 14 | LUCALEN A2710 SX | 59.4 | VULCAN P | 39.6 | 1 |
| 15 | LUCALEN A3110 MX | 59.4 | VULCAN P | 39.6 | 1 |
| 16 | ESCORENE UL00115 | 59.4 | VULCAN P | 39.6 | 1 |
| 17 | ESCORENE UL00119 | 59.4 | VULCAN P | 39.6 | 1 |
| 18 | NOVEX LM 1620AA | 59.4 | VULCAN P | 39.6 | 1 |
| 19 | ELVAX 460 | 59.4 | CONDUCTEX 900 | 39.6 | 1 |
| 20 | ELVAX 460 | 59.4 | CONDUCTEX 975 | 39.6 | 1 |
| 21 | RIBLENE D DV 2025 | 59.4 | VULCAN P | 39.6 | 1 |
| 22 | RIBLENE D FV 2040 | 59.4 | VULCAN P | 39.6 | 1 |
| 23 | SCLAIR 11D-1 | 59.4 | VULCAN P | 39.6 | 1 |
| 24 | SCLAIR 11D-1 | 59.4 | ENSACO MS | 39.6 | 1 |
| 25 | MARLEX 6003 | 59.4 | VULCAN P | 39.6 | 1 |
| 26 | HYTREL 4056 | 59.4 | VULCAN P | 39.6 | 1 |
| 27 | MARLEX HXM 50100 | 62.5 | VULCAN P | 36.5 | 1 |
| 28 | MARLEX HXM 50100 | 59.4 | VULCAN P | 39.6 | 1 |
| 29 | MARLEX HXM 50100 | 56.6 | VULCAN P | 42.5 | 0.9 |
| 30 | MARLEX HXM 50100 | 54.0 | VULCAN P | 45.1 | 0.9 |
| 31 | BPD 220 | 59.4 | VULCAN P | 39.6 | 1 |
| 32 | SCLAIR 8405 | 59.4 | VULCAN P | 39.6 | 1 |
| 33 | FINATHENE 5203 | 59.4 | VULCAN P | 39.6 | 1 |
| 34 | ELVAX 460 | 59.4 | SEVALCO N110 | 39.6 | 1 |
| 35 | MARLEX HXM 50100 | 59.4 | SEVALCO N110 | 39.6 | 1 |
| 36 | MARLEX HXM 50100 | 59.4 | ENSACO MS | 39.6 | 1 |

In table 1, ALATHON, ELVAX, HYTREL, UCAR, STAMYLEX, RIBLENE, ESCORENE, LUCALEN, NOVEX, BPD, MARLEX, SCLAIR, FINATHENE, which are all polymeric resins, are trademarks. The polymeric nature and the supplier of each resin are given in Table 2 below.

In Table 1, VULCAN, SEVALCO, ENSACO, STATEX, CONDUCTEX, are trademarks. These carbon blacks are supplied by the following companies:

| | |
|---|---|
| VULCAN | Cabot Corporation |
| SEVALCO | Sevalco Ltd |
| ENSACO | Ensagri Willebroek N.V. |
| STATEX | Columbian UK Ltd |
| CONDUCTEX | |

Plaques prepared according to the following procedure, from all the compositions in Table 1, were found to have resistivity/temperature and resistivity/recovery/expansion characteristics within the desired range. Resistivity temperature testing was carried out according to the above mentioned method.

Plaque Preparation for Electrical Testing

Plaques 150 mm × 150 mm × 1 mm were prepared by:
(1) pressing using 40 ton pressure for three minutes at a pressing temperature defined as $T_c + 100°$ C. where $T_c$ is the peak melting temperature of the resin measured using differential scanning calorimetry, as defined in ASTM D 3418-82.
(2) Cool pressing the plaque using 20 ton pressure at 30° C. for three minutes
(3) Irradiating to a prescribed dose

TABLE 2

| POLYETHYLENES | | | | |
|---|---|---|---|---|
| POLYMER RESIN | TYPE | DENSITY | MFI | SUPPLIER |
| UCAR FLX DFDA | VLDPE | 0.906 | 0.8 | UNION CARBIDE CORP |
| STAMYLEX 2H286 | VLDPE | 0.902 | 2.2 | DSM |
| STAMYLEX 2H287 | VLDPE | 0.906 | 2.2 | DSM |
| STAMYLEX 08-076 | VLDPE | 0.911 | 6.6 | DSM |
| NOVEX LM1620AA | LDPE | 0.916 | 2.0 | BP CHEMICALS |
| SCLAIR 11D-1 | LLDPE | 0.919 | 0.6 | DU PONT CANADA |
| MARLEX 6003 | HDPE | 0.963 | 0.3 | PHILLIPS |
| MARLEX HXM 50100 | HDPE | 0.95 | 1.6 | PHILLIPS |
| BPD 220 | LDPE | 0.916 | 0.16 | BP CHEMICALS |
| SCLAIR 8405 | LLDPE | 0.936 | 2.7 | DU PONT CANADA |
| FINATHENE 5203 | HDPE | 0.950 | 0.20 | FINA CHEMICALS |

| EVA | | | | |
|---|---|---|---|---|
| POLYMER RESIN | TYPE | VA CONTENT BY WEIGHT | MFI | SUPPLIER |
| RIBLENE D DV 2725 | EVA | 3% | 0.3 | ENICHEM SpA |
| ELVAX 770 | EVA | 9.5% | 0.8 | DU PONT |
| ESCORENE UL00909 | EVA | 9% | 9.0 | EXXON CHEMICALS |
| ELVAX 460 | EVA | 18% | 2.5 | DU PONT |

TABLE 2-continued

| ELVAX 470 | EVA | 18% | 0.7 | DU PONT |
|---|---|---|---|---|
| ESCORENE UL00115 | EVA | 15% | 0.65 | EXXON CHEMICALS |
| ESCORENE UL00119 | EVA | 19% | 0.65 | EXXON CHEMICALS |
| RIBLENE D DV 2025 | EVA | 3% | 0.3 | ENICHEM SpA |
| RIBLENE D FV 2040 | EVA | 19% | 0.7 | ENICHEM SpA |

| | | EEA | | |
|---|---|---|---|---|
| POLYMER RESIN | TYPE | EA CONTENT | MFI | SUPPLIER |
| ALATHON A-701 | EEA | 9% | 5 | DU PONT |
| ALATHON A-702 | EEA | 19% | 5 | DU PONT |
| ALATHON A-702 | EEA | 25% | 5 | |

| | | OTHERS | | | |
|---|---|---|---|---|---|
| POLYMER RESIN | TYPE | | | MFI | SUPPLIER |
| LUCALEN A2710 SX | EBA | BA CONTENT | 19% | 19.5 | BASF |
| LUCALEN A3110 MX | EBA | BA CONTENT | 8% | 7 | BASF |
| | | AA CONTENT | 4% | | |
| HYTREL 4056 | THERMOPLASTIC POLYESTER ELASTOMER | | | 5.3 | DU PONT |

Particularly preferred compositions for use in the present invention are described in British Patent Application 8729123 (RK365), (and in comtemporaneously filed application RK365 FF), the disclosures of which are included herein by reference. Particularly preferred compositions are heat-recoverable conductive polymer compositions having a resistivity at 25° C. of less than 25 ohm.cm and comprising:

(a) at least one matrix polymer and
(b) dispersed in said polymer a sufficient amount of one or more carbon blacks to achieve the desired resistivity, wherein
(i) the surface area (A) of the carbon black, or where there are two or more carbon blacks, the geometric means $\overline{A}$ of the surface areas of the carbon blacks is in the range 40–400 m$^2$g-1 and (ii) the ratio of the DBPA vlaue (D) in cm$^3$/100 g to the average particle size (S) in nm, or where there are two or more carbon blacks, the ratio of the arithmetic means of their DPBA values to the arithmetic mean of their paticle sizes $\overline{D}/\overline{S}$ is in the range 2.5 to 10.

DPBA values are measured according to ASTM D2414-86, and surface area values according to ASTM D3037-86.

Preferably the surface area is in the range 40–300, more preferably 40–260.

At least one carbon black used in the composition is preferably not a channel black, or any other carbon black having an outer oxide layer. Channel blacks typically have and other carbon blacks sometimes have, a substantially oxidised insulating layer on their outer surface. This layer significantly increases the resistivity of compositions containing such oxidised carbon blacks, and such compositions are not desirable in the present invention. The oxidised layer can, however, be removed by suitable treatment, and in this case the resistivity of compositions containing such treated carbon blacks with a previous oxidised layer is decreased. Compositions containing carbon blacks which previously had, but no longer have, an outer oxide layer may be acceptable in the present invention. A description of the chemistry of channel blacks, a typical carbon black having such an oxide layer, is found on page 114 of Carbon Black, Physics, Chemistry and Elastomer Reinforcement" by Donnet and Vole, Marcel Dekkar Inc. 1976 NY.

One example of a recoverable article according to the invention is now given. In this example the geometry of the part is such that it causes the predominant current path to be concentrated at the first or most recovered parts, while the electrical characteristics compensate for this effect. The electrical characteristics also influence the initial predominant direction of current flow in the article. The example comprises a shaped tubular article which has been expanded more in one region than in another region. The article is electroded part or the whole way along its length on opposite sides of the tube. It comprises a material whose resistivity decreases with expansion and increases on recovery and exhibits a pseudo PTC effect as defined by the invention. The parts of the article may all be expanded, to different amounts, or part can be zero expanded. The distance between the electrodes, (which is the current path distance) is greater for the most expanded parts. If such an article is made from a material having resistivity independent of expansion when the power is applied current will preferentially flow to the least expanded parts of the article, i.e. where it is least required to effect recovery. The use of a material with a resistivity which decreases with expansion mitigates such initial uneven undesired current flow.

During recovery, any parts which recover first or more will cause the electrodes to come closer together, and the wall thickness to increase. Both these effects tend to concentrate the current in the areas first or most recovered. However, as recovery occurs the material heats and the defined pseudo PTC effect increases the resistivity of the material. Also the expansion of the material is reversed and hence due to the defined resistivity—expansion—recovery behaviour the resistivity increases. Thus the electrical characteristics of the material of the article increase the resistivity of the material, and compensate for the geometry changes which would otherwise concentrate the current in the most or first recovered parts, and could otherwise lead to overheating.

In a uniformly expanded, for example tubular part, the electrical characteristics also compensate for the geometry effects during recovery, avoiding overheating. However in this case, since there is uniform expansion the resistivity-expansion characteristics of the material do not influence the direction of the initial flow of current in the article.

Preferred materials according to the invention are expanded 25%–500%, or 25%–300%, or 25%–200%. These materials preferably decrease in resistivity on expansion in at least part of the expansion range. The nature of the resistivity/expansion behaviour is less important for expansions less than 25% since the recoverable parts are desirably and generally arranged to retain this much unresolved recovery on application to a substrate.

The electrical characteristics especially the defined resistivity-expansion-recovery behaviour of the material may also be used to compensate for current concentrations caused by other geometrical considerations, for example the position of the electrodes. For example, where an electrode extends only part way along an article one electrode end terminates "in" a body of material. By this we mean that an end of the electrode is in contact with a region of the material which is not at the end of the article, thereby defining an inwardly directed electrode end. In the absence of compensatory features this electrode structure would tend to concentrate the current at the inwardly directed electrode ends with the possibility of overheating and hot-spot formation. The decreasing resistivity/expansion behaviour of the material can be used to compensate for this by arranging for the inwardly directed electrode end to terminate in a body of material that is less expanded (and hence of higher resistivity) than the material adjacent the main body of the electrode.

Geometry considerations (for example decreased wall thickness) may also be arranged to compensate for current concentration at an inwardly directed electrode end.

Also, depending on the position of the electrodes, the length of the current path may increase, decrease or stay unchanged during recovery. As an example, for a radially recoverable tubular article electroded longitudinally, the electrodes come closer together (i.e. the length of the current path decreases) on recovery. The same is true for a longitudinally recoverable tubular article electroded circumferentially. In other articles the length of the current path may change or remain substantially unchanged on recovery. For example for a radially recoverable article electroded circumferentially the length of the predominant current path is the length of the article. This will only change if recovery is significantly non-uniform.

For the materials used according to the invention the slope of the resistivity temperature curve after the peak resistivity is preferably greater than zero (i.e. the curve preferably levels or continues to rise). If the resistivity falls after the peak, it is preferred that, at a temperature 50° higher than the temperature of the peak resistivity, the resistivity is preferably within 35%, more preferably within 15% of the value of the peak resistivity.

Preferred conductive polymeric materials according to the invention are cross-linked for example by irradiating with high energy electrons to a beam dose in the range 2–35 MRads, especially 2–25 MRads, for example 10 or 15 MRads. Cross-linking enhances the recoverable behaviour of the material. Also we have found in some instances it improves the curl-over behaviour of the material (i.e. reduces any negative slope).

Where articles are moulded, the cross-linking may also be effected chemically. In this case a single step process can be used to mould and cross-link the material of the article. Such parts formed by moulding, e.g. transfer moulding, injection moulding can have complex shapes. As an example tubular articles with three or more outlets can be made. One example of a multi-outlet article is an article which is generally Y-shaped.

The degree of cross-linking of the compositions may be expressed in terms of gel content (ANSI ASTM D2765-68) of the cross-linked polymeric matrix of the composition (i.e. excluding the conductive filler or any other non polymeric additives present). Preferably the gel content of the polymeric matrix is at least 10%, more preferably at least 20%, e.g. at least 30%, more preferably at least 40%.

Where an article has two, three or more open ended outlets, all or only some outlets may be recovered. They may be recovered sequentially or substantially simultaneously.

A preferred multi outlet article comprises a main sleeve with a plurality of smaller sleeves extending from one end thereof. The main sleeve and some or all of the smaller sleeves may be closed in cross-section or wrap-around. The part is preferably moulded. Such an article may be used for example as a distribution closure in a telecommunications network for enclosing a splice between a main cable and cables branching therefrom.

Each of the features described above (viz pseudo PTC effect, resistivity/expansion/recovery behaviour, geometry) for regulating the current flow in the article initially and during recovery interact with each other. By understanding these features, and by appropriate selection of materials, article and electroding design, a laminar article can conduct current substantially parallel to the faces of the article, but avoid any problems of preferential current flow and consequent overheating. A number of preferred article designs are now discussed.

Embodiments according to the invention include tubular articles. These may be radially or longitudinally expanded, and uniform or non uniform in cross-section. They may be electroded, for example, by longitudinal electrodes of opposite polarity arranged on opposite sides of the tube, or by circumferential electrodes arranged on either end of the tube.

Where longitudinal electrodes are used they may extend along part or parts only of the article, or along the entire length of the article. Where separate pairs of electrodes extend along two or more parts of the article these can be powered separately or together, simultaneously or at different times, and by the same or different power sources.

Where the electrodes extend only part way along the length compensatory features are preferably provided to compensate for increased current density at the electrode ends as specified in British Patent Application 8723760 (DK004 GB3).

The whole part may be heated and shrunk simultaneously. Alternatively, by providing interrupted electrodes different parts can be heated independently. This is described in British Patent Application 8729122 (RK353), the disclosure of which is incorporated herein by reference.

One example of an article according to the invention is a tubular article electroded longitudinally, uniform in cross-section, electroded along its entire length, and uniformly deformed, e.g. expanded radially, say Y% along its length. As the article recovers the current path between the electrodes decreases and the wall thickness increases. These factors tend to lower resistance, and hence concentrate current to any region which recovered first or most (as would be case if the article was recovered onto a shaped substrate for example). To compensate for this, the article is preferably made from a material with the defined pseudo PTC effect and with a resistivity which decreases when expanded from X% to Y% (and increases again on recovery), where X is the residual expansion of the most recovered part, after recovery, and may be zero. Thus as recovery and heating take place the electrical characteristics increase the resistivity of the material, compensating for the decrease in resistance caused by the electrodes moving towards each other, and overheating is avoided.

A variation on the above is a tubular article which has been non-uniformly deformed, e.g. expanded radially along its length. For such an article it is generally preferred that current flows preferentially to the most deformed parts where most recovery is needed. Hence again, assuming the most deformed parts are expanded Y%, it is preferred to use a material whose resistivity decreases when expanded from X% to Y% (and increases correspondingly on recovery), which helps to compensate for the geometry factors which might direct the current otherwise.

A preferred tubular article which is non-uniformly expanded is expanded Y% at its most deformed part and Z% at its least deformed part, where Z is less than Y and greater than or equal to X (where X is the residual expansion in the most recovered parts after recovery). The article may be expanded Y% at one or both ends and Z% at its central part.

A preferred tubular article according to the invention is non-uniformly deformed for example expanded radially along its length, and is longitudinally electroded only, in part, for example only along the most deformed part or parts.

Articles with at least some parts deformed significantly different amounts are preferred for some embodiments according to the invention. The most deformed part or parts may in these cases be deformed, e.g. expanded, 25 to 600%, for example 25-300%. The less deformed parts in these articles preferably are deformed, e.g. expanded, 0-25%.

Other articles according to the invention are deformed substantially uniformly along their length. In these cases deformation e.g. expansion is preferably in the range 25-500%, more preferably in the range 25-300%.

One article according to the invention comprises a tubular article deformed, e.g. expanded, uniformly along its length and electroded part or the whole way along its length. This article can advantageously be recovered onto any shaped substrate. Where it recovers onto an irregular substrate, the geometry and electrical characteristics of the material vary the electrical resistance. This acts to shunt the predominant direction of current during the recovery process, thus ensuring uniform heating.

Another preferred article comprises a tubular article deformed, e.g. expanded, a significant amount, e.g. 25-500% at each end and a significantly smaller amount e.g. 0-25% at the central intermediate section. The deformation may be the same or different at each end. This article is preferably electroded by separate pairs or multiples of electrodes at each end, but not at all in the intermediate section. The inwardly directed electrode ends do however preferably extend a short distance into the intermediate section. In this case the electrodes at either end of the article are preferably powered separately, by separate power sources, but may be powered together. Where powered separately they may be powered by the same or different voltages, simultaneously, or at different times.

Another article according to the invention is a tubular article which has been expanded radially and has two or more, preferably three separately radially shrinkable sections. The article preferably comprises three longitudinally separated pairs of electrodes arranged to shrink each of the sections. The separate radially shrinkable sections may be separated by corrugated wall sections. One example of such an article is for cable blocking a cable splice, e.g. a splice between optical fibres. For this application there are three separately radially shrinkable sections. The central section contains a large mass of adhesive or other sealant for cable blocking. The end sections are lined with adhesive, e.g. a hot melt adhesive, for bonding to the cable, or other substrate.

For cable blocking and similar applications, there is not necessarily a requirement for the inner surface of the article to be smooth (since the substrate may not be.) Thus in the preferred case where the electrodes are provided on heat stable flanges projecting from the surface of the article (as described in British Patent Application 8810522 (DK003 GB5) these flanges may project outwardly from or inwardly into, the article, or both.

Another article according to the invention is a tubular article deformed, e.g. expanded radially, uniformly or nonuniformly and electroded circumferentially. Particularly where recovery is non-uniform (e.g. onto a shaped part) it is again preferred to use a material with the defined compensatory electrical characteristics so that the first or most recovered part (least expanded part) does not overheat.

An article according to the invention can be used in a method of joining two elongate substrates, or of repairing a damaged substrate comprising:

(a) positioning in thermal contact with, and surrounding the substrate, a tubular article comprising conductive polymeric material, having extending along the whole or part of its length at least two electrical connection means, preferably electrodes;

(b) connecting the electrical connection means to a source of electrical power to cause a substantial portion of the electrical current to flow between the electrical connection means substantially parallel to the faces of the article thereby heating the substrates conductive polymeric material; and (c) urging the conductive polymeric article radially inward towards the substrate(s).

The radially inwardmovement may be caused by recovery of the conductive polymeric material, or by the use of an elastomeric material.

This is described in British Patent Application 8805072 (RK352-A) the disclosure of which is incorporated herein by reference.

Radially recoverable tubular articles can typically be used for example for covering or joining conduits such as supply-lines, especially pipes or cables, or splices or joints therebetween.

Other articles according to the invention include tubular articles that are longitudinally recoverable. These may be for example electroded circumferentially, in which case the current path decreases on recovery and a material whose resistivity decreases with expansion is especially preferred. Alternatively the article may be electroded longitudinally where the same resistivity/expansion behaviour is still preferred, particularly in cases of non-uniform recovery.

An example of an application for a longitudinally recoverable article is to seal annular spaces, as is required, for example, in a duct seal. In this case, when the article recovers it increases in wall thickness to fill the annular space between the parts. Whatever the position of the electrodes such a wall thickness increase almost inevitably leads to non-uniform recovery, making the preferred resistivity/expansion behaviour particularly desirable.

Another article according to the invention comprises a tubular heat-recoverable article, preferably a duct seal, which has been deformed to render it recoverable, comprising an electrically conductive polymeric material and electrical connection means, the deformation of the article and the position of the electrical connection means being such that when the electrical connection means are electrically connected to an appropriate source of electrical power, electrical current flows through at least one region of the article, heating and recovering the article, whereby on recovery at least a section of the article increases in wall thickness.

This is described in British Patent Application 8723762 (DK006) the disclosure of which is incorporated herein by reference.

Tubular articles according to the invention may be electroded part way or entirely along their length, or part way or entirely around their circumference. Preferred articles according to the invention have at least one electrode coextensive with at least one dimension of the expanded part or parts of the article.

The advantages of the present invention in controlling current flow are particularly useful where the electrodes are positioned so that there are two or more discrete current paths between the electrodes. This is the case for example for a radially recoverable tubular article with longitudinal electrodes on opposite sides of the tube. In this case there are two distinct current paths connecting the electrodes, one on each side of the article. Preferential current flow to one part (one side) of the article in these applications would be particularly disadvantageous since it would result in one side recovering and not the other.

Electrodes may be positioned on the surface of the article or embedded therein. As used herein, the term electrode means a bus wire or electrical conductor adapted for applying electrical power to the conductive article. Preferably the electrodes are provided on or in a heat stable part, for example, on a flange of the article. This is described and claimed in British Patent Application No. 8810522 (DK003 GB5), the disclosure of which is incorporated herein by reference. Where electrodes are provided as part of the article they may comprise for example silver paint electrodes or embedded wires for example plain wires, braided wires, a mesh, spray coated electrodes. Surface electrodes may be ultrasonically bonded onto the part. Where the article does not itself comprise electrodes they can be added later, e.g. in the field. The article may be specifically adapted for such electrodes to be applied in any suitable way. For example it may comprise lugs or flanges for the attachment of electrodes, such as silver paint srips, or conductive wires thereto. Crocodile clips, or the like, may be attached to the electrodes.

It may be useful to include a layer of material adjacent to the electrodes having a resistivity lower than that of the bulk of the material, for example to minimise heating around the electrodes. This additional layer may be ZTC, NTC or PTC.

For some applications it is desirable to provide a cutoff switching mechanism to avoid severe overheating of articles according to the invention. Overheating might occur, for example, if an installer omitted to switch off the electrical power supply when recovery was complete, so that heating occurred for several minutes thereafter. Such overheating is a particular danger if a composition is used which exhibits negative curl-over resistivity/temperature behaviour, where runaway heating may result. For these applications, it is preferred to make articles in which the electrode is surrounded by a PTC material which shows a very sharp rise in resistivity at a particular temperature. The PTC material surrounding the electrode is preferably selected to exhibit the sharp rise in resistivity at a temperature above the temperature at which the "peak" resistivity of the bulk polymer of the article is reached. This means that the supply of electrical current to recover the article will only be switched off if temperatures are reached in excess of those needed to effect recovery.

Preferred articles according to the invention are tubular. The tubular articles may be integrally formed closed in cross-section. As an alternative, the articles may be open in cross-section, i.e. a wraparound tubular article may be used. As used herein the term "wraparound" means a cover which can be wrapped around a substrate, and longitudinal edges secured together to form a tubular article around the substrate. Wraparound covers may be closed in any suitable way. For example upstanding flanges which can be held together by clamps or by a channel shaped closure may be provided at or near the longitudinal edges. Longitudinal electrodes may be included in the upstanding flanges, or at the base thereof, and/or extending along part of the main body of the cover. A wraparound cover can conveniently be made by extrusion. The electrodes can be embedded in the cover during the extrusion process.

Another preferred article according to the invention comprises a conductive polymeric hold-out layer which holds in a stretched state an elastomeric layer. The hold out layer may be the inner or the outer layer. The elastomeric layer is allowed to recover when the conductive layer heats.

Where the article is tubular with one or more open ends, it may be desirable to seal between two or more substrates exiting the open end. This can be achieved using a branch-off clip (e.g as disclosed in U.S. Pat. No. 4,648,924) which brings together circumferentially spaced portions of the walls of the article between the substrates. Alternatively an electrically-heated filling piece may be used. The electrically heated clip and filling piece may be powered by the same power supply that is used to heat and recover the article.

Articles according to the invention may be coated on their internal and/or external surfaces with adhesive and/or sealant or other insulation. This may be advantageous for some applications.

As mentioned before, the article according to the invention can preferentially be used in applications where high recovery is needed, without fear of overheating or runaway heating. Preferred articles according to the invention have recovery ratios of at least 2:1, or at least 3:1, even 4:1.

The maximum resistance of any part of the article which is to be recovered, before recovery, determines the voltage source which must be applied to effect recovery of the article. This resistance depends on the geometry of the part and its maximum resistivity. For preferred articles according to the invention this maximum resistivity, at least in the expanded state is less than 50 ohm.cm, preferably less than 10 ohm. cm, more preferably less than 7 ohm.cm, especially preferably less than 5 ohm.cm before recovery. Preferably the article can be recovered by a voltage source of at most 70 V, preferably at most 48 Volts, more preferably at most 24 Volts.

The article according to the invention can be made by any suitable method, e.g. extrusion or moulding.

Embodiments of the invention are now described, by way of example, wherein:

FIGS. 1a and 1b are longitudinal sections through a first article according to the invention before and after expansion respectively;

FIG. 2 is a cross-sectional through line I—I of FIG. 1b.

FIG. 8 shows the resistivity temperature curves of differentially expanded dumbells of a composition according to the below example.

Figure 3A:
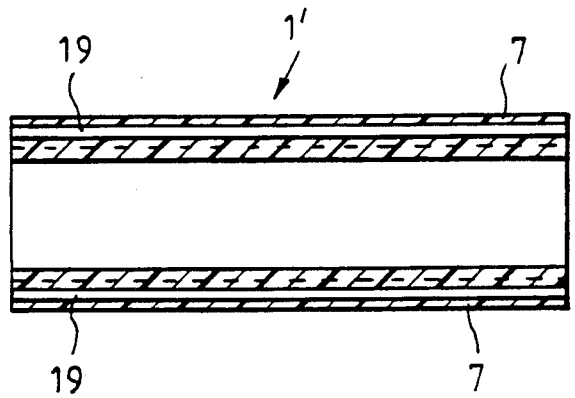
FIGS. 3a and 3b are longitudinal sections through a second article according to the invention before and after expansion respectively.

Referring to the drawings, FIGS. 1a and 1b show (in longitudinal section) tubular article 1 comprising end sections 3 and 4 and intermediate main body section 5 before and after expansion respectively, and FIG. 2 shows the article in cross-section. End sections 3 and 4 are expanded $Y_{1\%}$ or $Y_{2\%}$ respectively and main body section $X\%$ where $Y_1$ and $Y_2$ are greater than X and $Y_1$ or $Y_2$ may be the same or different. The wall thickness of the article in ends 3 and 4 is greater than that in the main body 5 before expansion, and substantially the same after expansion (as shown by the dotted lines indicating the inner surface of the article). The article comprises a conductive polymeric material which in its expanded state is heat recoverable and exhibits a PTC ratio of about 5. The material also decreases in resistivity when expanded by more than $X\%$ e.g. to $Y_1$ or $Y_2\%$. Two pairs of longitudinal flange support elements 7 and 8 respectively, which also comprise conductive polymeric material extend on opposite sides of the article, along end sections 3 and 4 respectively but not along body section 5. Silver electrode strips 9 and 10 are painted on the flanges 7 and 8 respectively and extend a short distance onto main body section 5. The electrodes 9 and 10 terminate in a body of conductive polymeric material to define inwardly directed electrode ends 15 and 16. The silver strips 9 and 10 are connected by crocodile clips 11 and 12 respectively to 50 V power sources 13 and 14. The electrodes 9 and 10 on ends 3 and 4 are connected to separate power sources to enable them to be powered separately by different voltages, and/or at or for different times. The resistivities of end sections 3 and 4 are 3 ohm.cm and in main body section 5 is 9 ohm.cm.

The article 1 has been made by blow moulding, wherein edges of the parison are trapped by parts of the mould and compression moulded to form the flanges 7 and 8.

To recover the article onto a substrate, the electrodes 9 and 10 are powered by power sources 13 and 14, at the same or different times, causing current to flow around the circumference of the article between the electrodes, thereby heating the article and effecting recovery.

The recovery of one end 3, when one power source 13 is activated is now described, by way of example. Recovery of the other end 4 would be similar.

Figure 7:
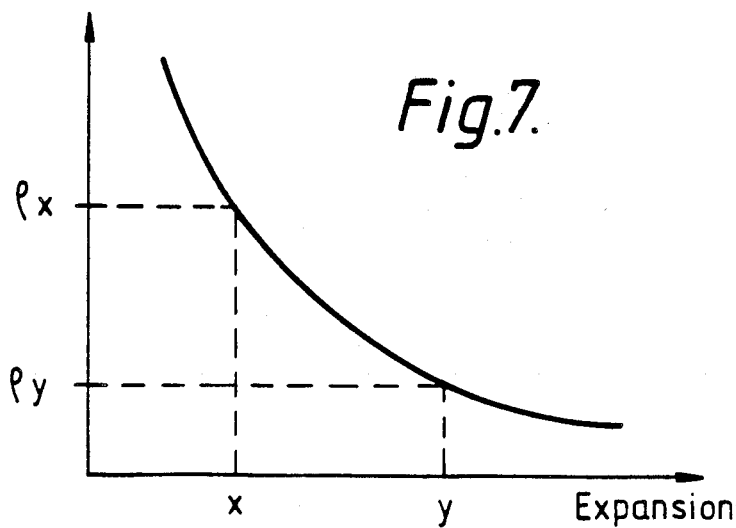
FIG. 7 is a graph showing the resistivity/expansion behaviour at room temperature of the material used in the article of FIGS. 1 to 5.

The direction of the current flow through the article is predominantly along the path of least resistance. When current is first applied by power source 13 the wall thickness of the end section 3 and the main body 5 (in the expanded part) are substantially the same. Thus the geometry does not affect the resistance. The resistivity in ends 3 is however less than in main body 5, thus initally the path of lowest electrical resistance is through the end rather than the body 5, and current flows predominantly through end 3. This initial current direction is explained further with reference to FIG. 7 which shows the resistivity/expansion behaviour of the material of the article of FIG. 1. The resistivity $\rho x$ of a material expanded $X\%$ (e.g. the material in the main body section 5) is significantly greater than the resistivity $\rho y$ of a material expanded $Y_{1\%}$ (e.g. the material of end section 3). Because the resistivity of main body section 5 is greater than the resistivity of end section 3 current preferentially flows through the end, i.e. where recovery is most needed. This feature also increases the resistance to current flow at the inwardly directed electrode end 15, where in the absence of such compensatory features current density would be expected to be greater than between the main length of the electrodes.

As recovery occurs, the electrodes on end 3 are brought closer together and the wall thicknesses increase. Both these features tend to decrease the resistance between the electrodes and hence increase the tendency for current to flow in end 3. If one region recovers first or most, in the absence of compensatory electrical characteristics, this could lead to overheating of those first or most recovered regions. However as recovery occurs the expansion of the material is decreased causing its resistivity to increase (moved to the left of the resistivity/expansion curve of FIG. 7). Also the PTC effect comes into action causing the material resistivity to increase. Hence during recovery any tendencies to shunt current to any particular region due to geometry changes are compensated for by the electrical characteristics of the material.

Figure 3B:
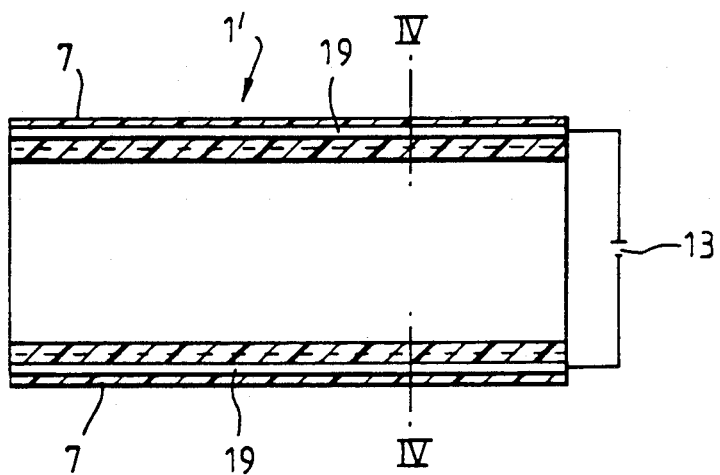
Figure 4:
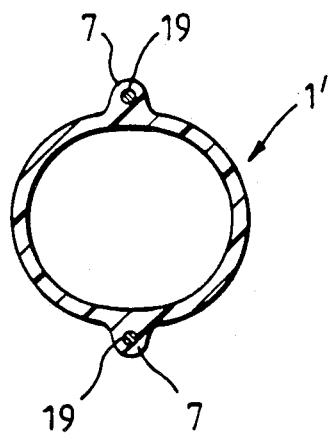
FIG. 4 is a cross-section through line IV of FIG. 3b.

FIGS. 3a and 3b and 4 show a similar article. In this case the article is uniformly expanded along its length, and has uniform wall thickness. It comprises electrodes 19 embedded in flanges 7, rather than on the surface, and these electrodes extend along the entire length of the article.

Initially current flow is throughout the article since geometry and resistivity considerations are the same along the length. During this initial stage (before the article contacts the substrate) any tendency for any particular region to recover first or most (due to e.g. ambient conditions) is mitigated by that region increasing in resistivity as a result of its resistivity/expansion behaviour and PTC behaviour. When one end of the article contacts the part of the substrate of largest diameter its recovery ceases. The other end continues to recover towards the smaller diameter part of the substrate. The electrodes come closer together at this end and the wall thickness increases, tending to direct the current to this end. The electrical characteristics of the material increase the resistivity of the material to compensate for this.

Figure 5:
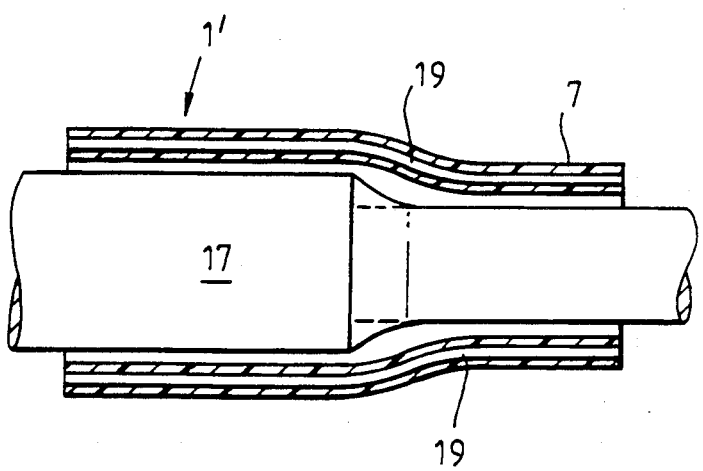
FIG. 5 shows the article of FIGS. 3 and 4 recovered onto a substrate of non-uniform cross-section.

FIG. 5 shows the article of FIGS. 3 to 4 recovered onto a shaped substrate 17. The appearance after recovery of the article of FIGS. 1 to 2 would be similar, except that the electrodes extend only part way.

Figure 6:
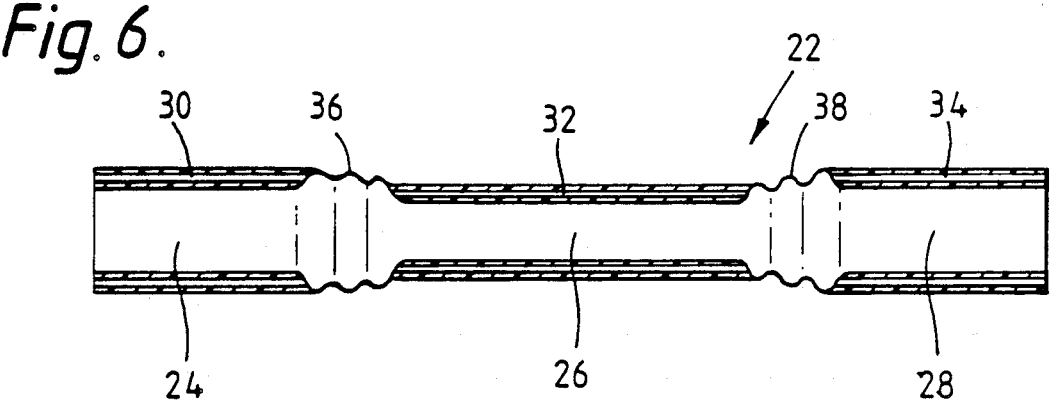
FIG. 6 shows another tubular article according to the invention.

FIG. 6 shows another tubular article 2 according to the invention. It comprises three radially shrinkable sections 24, 26, 28 which are electroded by separate pairs of electrodes 30, 32, 34. The sections 24, 26, -28 are longitudinally separated by corrugated regions 36, 38. All three sections are lined with adhesive (not shown) and central section 26 contains a large mass of sealant. In use, cables to be spliced and sealed are inserted through ends 24 and 28 into the central section 26. The electrodes 32 on the central section 26 are connected to an electrical power source causing it to heat, the sealant to flow and block the cables, and the section 26 to recover, and the electrodes 30, 34 on end sections 24 and 28 are connected to the source of electrical power to heat and recover those end sections into sealing engagement with the cables. Sections 24, 26, 28 may be heated and/or recovered in any order or substantially simultaneously.

EXAMPLE

An article according to FIGS. 1a and 1b and 2, and also an article according to FIGS. 3a, 3b and 4 were made from the composition number 10 (from Table 1) viz 59.4 parts by weight E1VAX 460 (trade mark) and 39.6 parts by weight VULCAN P (trade mark) and 1 part by weight antioxidant. The article according to FIGS. 1a and 1b and 2 was made by blow moulding. The article according th FIGS. 3a, 3b and 4 was made by extrusion. Both articles were expanded and then caused to recover fully onto a support mandrel in less than five minutes on application of 48 volts from a portable power supply.

From plaques of composition number 10 prepared according to the earlier described method, dumbells were cut and expanded at $T_c + 100°$ C. (where $T_c$ is peak melting temperature measured using differential scanning calorimetry). Some test dumbells were expanded $1.5 \times$ (50% expansion), some $2 \times$ (100% expansion) and some $3 \times$ (200% expansion).

The resistivity/temperature curves of the differentially expanded dumbells of composition number 10 were plotted and are shown in FIG. 8. The curves for the $1.5 \times$, $2 \times$ and $3 \times$ expanded dumbells were measured by restraining the dumbells to prevent their recovery.

The curves shown in FIG. 8 are for the first time of heating of each material (i.e. the first time of heating after the heating step to effect expansion). Subsequent cooling and/or heating curves are not shown.

From FIG. 8 it can be seen that the peak resistivity per se, and hence also the pseudo PTC ratio decreases with expansion, but that even at $3 \times$ expansion there is a pseudo PTC effect. The values for peak resistivity and pseudo PTC ratio in each case are as follows:

|  | Peak Resistivity in ohm · cm | Resistivity at 25° C. in ohm · cm | Pseudo PTC ratio |
| --- | --- | --- | --- |
| curve 1: expanded 1.5× | 23.6 | 6.1 | 3.9 |
| curve 2: expanded 2× | 16.0 | 5.1 | 3.0 |
| curve 3: expanded 3× | 8.1 | 4.1 | 2.0 |

Recoverable parts of composition number 10 (which are always expanded) therefore clearly have a pseudo PTC ratio in the desired range 1½ to 10.

Also by comparing the resistivities of the samples at 25° C., the composition clearly show a decrease in resistivity on expansion.

The disclosures of the following contemporaneously filed applications are also incorporated in the present specification by reference (our ref: DK003FF, DK004FF, DK006FF, RK352-A FF, RK353 FF).

I claim:

1. A heat-recoverable article comprising an element which
   (a) is laminar,
   (b) is composed of a conductive polymer,
   (c) has been rendered heat-recoverable by an expansion process, and
   (d) can be caused to recover by passing electrical current through the element, thus generating heat which causes recovery of the element;

the conductive polymer being one whose resistivity, measured in the direction of expansion, decreased during at least part of the expansion process.

2. An article according to claim 1 wherein different parts of the conductive polymer element have been expanded by different amounts, the minimum expansion being X%, where X may be zero, and the maximum expansion being Y%, and wherein the resistivity of the conductive polymer is less in areas which have been expanded at the expansion of Y% than it is in areas which have been expanded at the expansion of X%.

3. An article according to claim 1 which comprises two or more electrodes which can be connected to a source of electrical power and which, when connected to a suitable source of electrical power, cause electrical current to flow through the laminar element, a substantial proportion of the electrical current being substantially parallel to the faces of the element, and to generate heat which causes recovery of the element, the resistivity of the conductive polymer, measured in the direction of current flow in the area of recovery as the element is caused to recover, increasing during at least part of the recovery process.

4. An article according to claim 1 wherein the conductive polymer in the laminar heat-recoverable element exhibits a pseudo PTC ratio in the range 1.5 to 10.

5. An article according to claim 1 wherein at least part of the heat-recoverable conductive polymer element has been expanded by at least 25% to render it heat-recoverable.

6. An article according to claim 5 wherein at least part of the conductive polymer element has been expanded by at least 100%.

7. An article according to claim 1 wherein the laminar conductive polymer element is tubular and has been radially expanded to render it radially recoverable.

8. An article according to claim 3 wherein the laminar conductive polymer element is tubular and has been radially expanded to render it radially recoverable, and wherein the electrodes are longitudinal electrodes extending at least part way along the length of the laminar element so that, when the electrodes are connected to a source of electrical power current flows around the circumference of the tubular element.

9. An article according to claim 1 wherein the laminar conductive polymer element is tubular and has been longitudinally expanded to render it longitudinally recoverable.

10. An article according to claim 3 wherein the laminar conductive polymer element is tubular and has been longitudinally expanded to render it longitudinally recoverable, and wherein the electrodes are circumferential electrodes positioned so that, when the electrodes are connected to a source of electrical power, current flows along the length of the tubular element.

11. An article according to claim 3 wherein the distance between the electrodes decreases when the article is recovered.

12. An article according to claim 2 wherein at least one of the electrodes is coextensive with at least one dimension of the recoverable part of the laminar element.

13. An article according to claim 1, wherein the maximum resistivity of any part of the laminar conductive polymer element is at most 25 ohm-cm.

14. An article according to claim 13 wherein the maximum resistivity is at most 10 ohm-cm.

15. An article according to claim 1, wherein the conductive polymer is cross-linked.

16. An article according to claim 3 wherein the electrical resistance of the article increases during at least part of the recovery process.

17. A heat-recoverable article comprising a laminar element
(1) which is composed of a conductive polymer composition,
(2) which can be connected to a source of electrical power to cause current to pass through the element and to generate heat therein, thereby effecting recovery of the article, and
(3) which changes shape when the article recovers;
the conductive polymer composition being such that, if it is subjected to a test sequence which comprises:
(a) forming the composition into a sheet,
(b) expanding the sheet to render it heat-recoverable, the sheet being expanded by 300% or, if the sheet breaks before it has been expanded by 300%, the sheet being expanded by the maximum amount which is possible without breaking the sheet,
(c) cutting the expanded sheet into a plurality of substantially identical test pieces,
(d) recovering each of said test pieces by procedures which are substantially identical except that the extent of the permitted recovery is different, with each successive test piece being recovered to a residual expansion which is 20% less than the preceding test piece,
(e) for each of the recovered test pieces, measuring the resistance at 25° C. in the direction of recovery, and calculating the resistivity of the conductive polymer in the recovered test piece, and
(f) preparing a graph which plots for the recovered test pieces, the calculated resistivity of the conductive polymer versus the extent of the recovery,
then in at least part of said graph, the resistivity increases as the extent of the recovery increases.

18. An article according to claim 17 wherein there is a decrease in the resistivity of the conductive polymer in at least one of the test pieces having residual expansions of 50 to 150%, as compared to the test piece with 20% less permitted recovery.

19. An article according to claim 18 wherein the resistivity of the conductive polymer at a residual expansion of 50% is at least 1.4 times the resistivity of the conductive polymer at a residual expansion ration of 200%.

20. A heat-recoverable article comprising
(1) an element which
(i) is laminar,
(ii) is heat-recoverable, and
(iii) is composed of a conductive polymer; and
(2) electrodes which can be connected to a source of electrical power and which, when connected to a suitable source of electrical power, cause current to pass through the laminar heat-recoverable element, a substantial proportion of the electrical current being substantially parallel to the faces of the element, and to generate heat which causes recovery of the element,
the resistivity of the conductive polymer, measured in the direction of current flow in the area of recovery as the element is caused to recover by connecting the electrodes to a suitable power source, increasing during at least part of the recovery process.

21. An article according to claim 20 wherein the conductive polymer in the laminar heat-recoverable element exhibits a pseudo PTC ratio in the range 1.5 to 10.

22. An article according to claim 20 wherein the laminar conductive polymer element is tubular and is radially recoverable, and the electrodes are longitudinal electrodes extending at least part way along the length of the laminar element, so that, when the electrodes are connected to a source of electrical power, current flows around the circumference of the tubular element.

23. An article according to claim 20 wherein the resistivity of the conductive polymer is at most 25 1 ohm-cm.

24. A heat-recoverable article comprising
(1) an element which
(i) is laminar
(ii) is heat-recoverable, and
(iii) is composed of a conductive polymer which exhibits a pseudo PTC ratio in the range 1.5 to 10; and
(2) electrodes which can be connected to a source of electrical power and which, when connected to a suitable source of electrical power, cause current to pass through the laminar heat-recoverable element, a substantial proportion of the electrical current being substantially parallel to the faces of the element, and to generate heat which causes recovery of the element.

25. An article according to claim 24 wherein the laminar conductive polymer element is tubular and is radially recoverable, and the electrodes are longitudinal electrodes extending at least part way along the length of the laminar element, so that, when the electrodes are connected to a source of electrical power, current flows around the circumference of the tubular element.

26. An article according to claim 24 wherein the resistivity of the conductive polymer is at most 25 ohm-cm.

27. A method of covering a substrate which comprises (1) positioning a heat-recoverable laminar article around the substrate, the article comprising a heat-recoverable article comprising an element which
  (a) is laminar,
  (b) is composed of a conductive polymer,
  (c) has been rendered heat-recoverable by an expansion process, and
  (c) has been rendered heat-recoverable by an expansion process, and
  (d) can be caused to recovery by passing electrical current through the element, thus generating heat which causes recovery of the element;
the conductive polymer being one whose resistivity, measured in the direction of expansion, decreased during at least part of the expansion process; and
(2) causing current to flow through the laminar heat-recoverable element, a substantial proportion of the electrical current being substantially parallel to the faces of the element, and to generate heat which causes recovery of the element.

28. A method of covering a substrate which comprises
  (a) positioning a heat-recoverable laminar article around the substrate, the article comprising
    (1) an element which
      (i) is laminar,
      (ii) is heat-recoverable, and
      (iii) is composed of a conductive polymer; and
    (2) electrodes which can be connected to a source of electrical power and which, when connected to a suitable source of electrical power, cause current to pass through the laminar heat-recoverable element, a substantial proportion of the electrical current being substantially parallel to the faces of the element, and to generate heat which causes recovery of the element;
the resistivity of the conductive polymer, measured in the direction of current flow in the area of recovery as the element is caused to recover by connecting the electrodes to a suitable power source, increasing during at least part of the recovery process; and
  (b) connecting the electrodes to a suitable source of electrical power, thus effecting recovery of the article.

29. A method of covering a substrate which comprises
  (a) positioning a heat-recoverable laminar article around the substrate, the article comprising
    (1) an element which
      (i) is laminar
      (ii) is heat-recoverable, and
      (iii) is composed of a conductive polymer which exhibits a pseudo PTC ratio in the range 1.5 to 10; and
    (2) electrodes which can be connected to a source of electrical power and which, when connected to a suitable source of electrical power, cause current to pass through the laminar heat-recoverable element, a substantial proportion of the electrical current being substantially parallel to the faces of the element, and to generate heat which causes recovery of the article,
  (b) connecting the electrodes to a suitable source of electrical power, thus effecting recovery of the article.

* * * * *

UNITED STATES PATENT AND TRADEMARK OFFICE

CERTIFICATE OF CORRECTION

PATENT NO. : 5,003,163

DATED : March 26, 1991

INVENTOR(S) : Per J.T. Jensen

It is certified that error appears in the above-identified patent and that said Letters Patent is hereby corrected as shown below:

Column 11, line 11, replace "Alathon A-702" by --Alathon A-703--.

Column 11, line 36, replace "vlaue" by --value--.

Column 14, line 65, after "would be" insert --the--.

Column 16, line 50, replace "inwardmovement" by --inward movement--.

Column 17, line 61, replace "srips" by --strips--.

Column 23:
Claim 12, line 1, replace "claim 2" by --claim 3--.

UNITED STATES PATENT AND TRADEMARK OFFICE

CERTIFICATE OF CORRECTION

PATENT NO.   :   5,003,163

DATED        :   March 26, 1991

INVENTOR(S)  :   Per J.T. Jensen

It is certified that error appears in the above-identified patent and that said Letters Patent is hereby corrected as shown below:

Column 24:
    Claim 20, line 17, after "increasing", insert --as a result of the recovery--.

Claim 20, line 18, after "process", insert --, whereby the flow of current through the article is adjusted during the recovery process--.

Claim 23, line 2, after "25", delete "1".

Column 26, line 34, insert as a new claim:
--30. A method according to claim 27 wherein the current is caused to flow through the heat-recoverable element by means of electrodes which are secured to heat-stable parts of the article after the article has been positioned around the substrate.--

Signed and Sealed this

Sixth Day of July, 1993

Attest:

MICHAEL K. KIRK

Attesting Officer

Acting Commissioner of Patents and Trademarks